(12) United States Patent
Gluska et al.

(10) Patent No.: US 7,254,625 B2
(45) Date of Patent: Aug. 7, 2007

(54) METHOD FOR ASSIGNING NETWORK ADDRESSES

(75) Inventors: Eran Gluska, Ramat Aviv (IL); Omri Viner, Aly (IL); Irit Shahar, Ra'anana (IL); Michael Mesh, Kfar Saba (IL); Yuval Porat, Ramat Aviv (IL); Alex Cheskis, Kfar Saba (IL)

(73) Assignee: Packetlight Networks Ltd., Kfar Saba (IL)

( * ) Notice: Subject to any disclaimer, the term of this patent is extended or adjusted under 35 U.S.C. 154(b) by 693 days.

(21) Appl. No.: 09/952,092

(22) Filed: Sep. 13, 2001

(65) Prior Publication Data
US 2003/0051014 A1 Mar. 13, 2003

(51) Int. Cl.
*G06F 15/177* (2006.01)
(52) U.S. Cl. .................. 709/222; 709/220; 709/223
(58) Field of Classification Search ............... 709/220, 709/222, 223
See application file for complete search history.

(56) References Cited

U.S. PATENT DOCUMENTS

| | | | |
|---|---|---|---|
| 5,319,699 A * | 6/1994 | Kerihuel et al. ............ 455/461 |
| 5,796,627 A * | 8/1998 | Roldan ........................ 702/60 |
| 5,961,597 A * | 10/1999 | Sapir et al. .................. 709/224 |
| 5,999,528 A | 12/1999 | Chow et al. |
| 6,101,499 A * | 8/2000 | Ford et al. ..................... 707/10 |
| 6,229,804 B1 * | 5/2001 | Mortsolf et al. ............ 370/352 |
| 6,289,377 B1 * | 9/2001 | Lalwaney et al. .......... 709/222 |
| 6,415,314 B1 * | 7/2002 | Fee et al. .................... 709/201 |
| 6,501,746 B1 * | 12/2002 | Leung ........................ 370/338 |
| 6,581,108 B1 * | 6/2003 | Denison et al. ............. 709/245 |
| 6,880,086 B2 * | 4/2005 | Kidder et al. ............... 713/191 |

OTHER PUBLICATIONS

Jha, "A Hybrid Data Transport Protocol for Sonet/SDH and Direct Data Overooptical Networks", 2000, pp. 13-23.
Choa et al "Transparent All-Optical Packet Rouging-One Network for All Traffic", 1999, pp. 217-224.

* cited by examiner

*Primary Examiner*—Ario Etienne
*Assistant Examiner*—Avi Gold
(74) *Attorney, Agent, or Firm*—Dennison, Schultz & MacDonald

(57) ABSTRACT

An IP address assignment method including assigning a chassis serial number to a node during manufacture, generating an array of unique IP addresses composed using the chassis serial number, and assigning a unique IP address from the array to each interface associated with the node.

13 Claims, 2 Drawing Sheets

Node IP Address structure

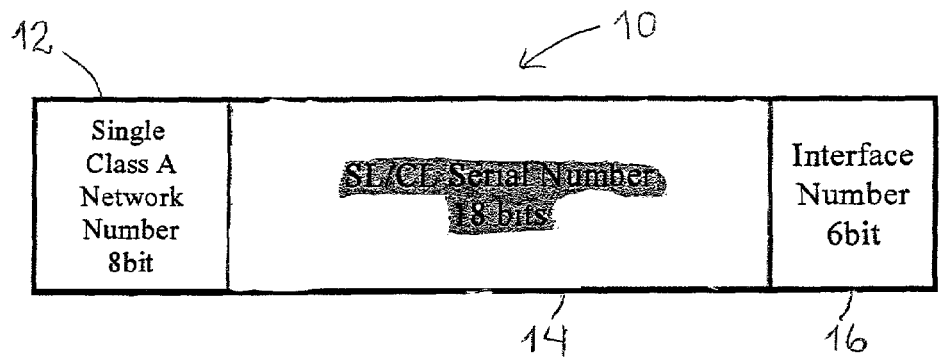
Figure 1: Node IP Address structure
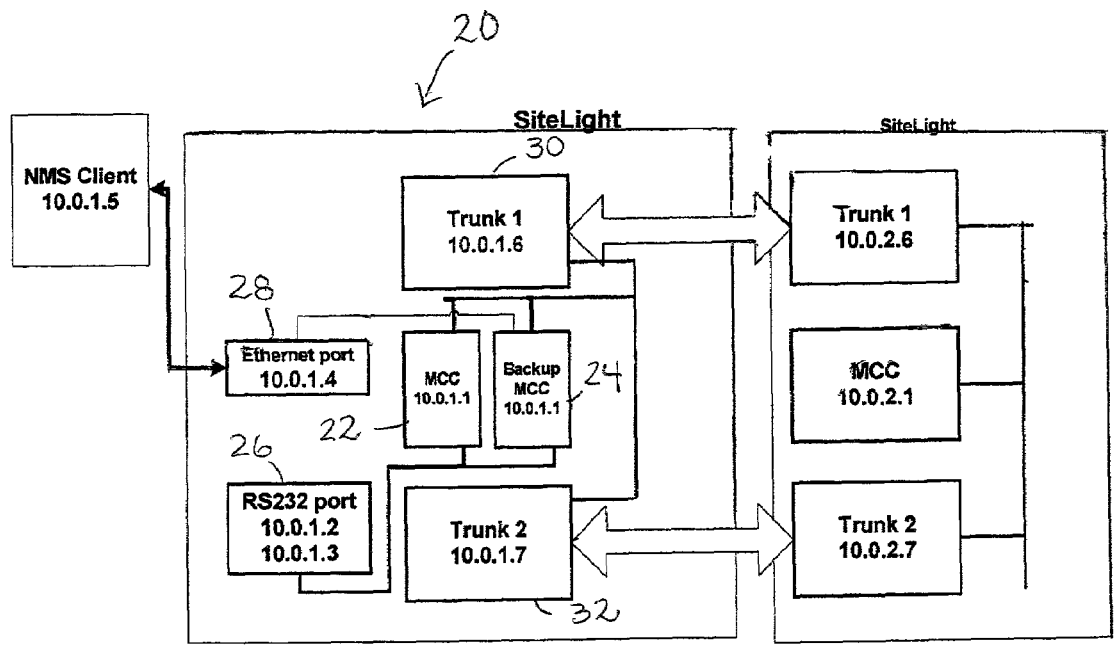
Figure 2: Port IP Address Distribution

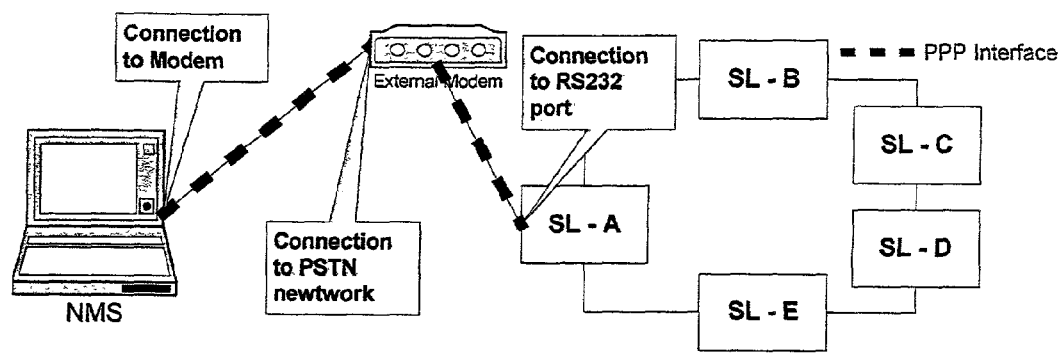
Figure 3: PPP Direct Connection via external modem
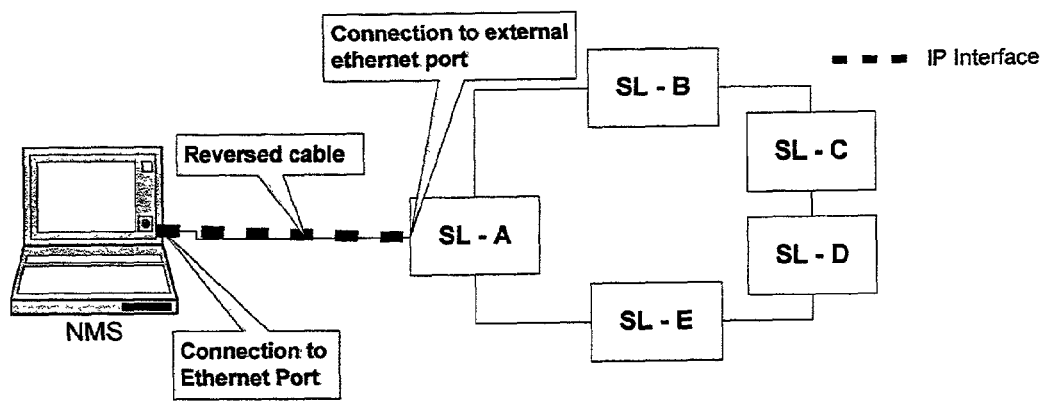
Figure 4: IP Direct Connection via external ethernet port

METHOD FOR ASSIGNING NETWORK ADDRESSES

FIELD OF THE INVENTION

The present invention relates to a unique scheme for IP address assignment in a telecommunication network, which transfers data and voice via proprietary packets. These network nodes need management control and administration in order to transmit communication traffic. This addressing provides the base for IP communication between nodes of the communications network and for connection to various external networks.

BACKGROUND OF THE INVENTION

An IP (Internet Protocol) Address is an identifier for a computer or device on a TCP/IP network. Networks using the TCP/IP protocol route messages based on the IP address of the destination. The format of an IP address is a 32-bit numeric address written as four numbers separated by periods. Each number can be zero to 255. For example, 1.160.10.240 could be an IP address.

Within an isolated network, one can assign IP addresses at random, as long as each one is unique. However, connecting a private network to the Internet requires using registered IP addresses (called Internet addresses) to avoid duplicates. The four numbers in an IP address are used in different ways to identify a particular network and a host on that network. The InterNIC Registration Service (which was created in 1993 by the National Science Foundation—an independent agency of the U.S. government to provide registration services to Global Internet) assigns Internet addresses from the following three classes:

- Class A—First octet 1→127—supports 16,777,214 hosts on each of 126 networks
- Class B—First octet 128→191—supports 65,384 hosts on each of 16,384 networks
- Class C—First octet 192→223 supports 254 hosts on each of 2 million networks From the earliest definition of the Internet, it was required that every address be unique. During the first 30 years of the Internet, such uniqueness was provided by the InterNIC organization, which supplied unique IP address subnets (groups of addresses). However, during the last 5 years, with the enormous growth of the Internet, most of class A and B addresses have been allocated. The next solution described in RFC 1597 was found: three different IP address subnets, in each class are reserved to the global community, and never will be supplied. It will also be defined that every standard Layer 3 router MUST ignore and NOT relay every IP datagram, which has a reserved source or destination addresses. Thus, IP addresses that do not need to contact the global internet directly could be assigned in the private IP space. The connection to Internet is done only by connection through so-called NAT or PROXY servers.

There are several desired criteria of an IP addressing system:

1. Every interface in a node must have IP address (trunk, Ethernet interface)
2. Any IP address in a particular network must be unique.
3. "Automatic" default assignment of IP addresses. The assignment scheme should allow distributing automatically IP addresses to every node in a selected communications network, without any external interference. The addresses should be "secured" and "private".
4. The assignment scheme should allow the use of TCP/IP protocols between nodes.
5. The IP addressing scheme should allow merging of multiple networks without additional assignment work.
6. The IP addressing scheme should allow one to avoid problems with IP addressing, even in case of single or multiple node failure.
7. Preferably, the node IP address should be configurable by management. In other words, it should be possible to change a node IP address by management software. This allows a customer to use its own propriety IP addresses.
8. The IP addresses should be secured from public networks, and the Global Internet. The structure of the addresses would deny packet transitions between nodes with public IP addresses and those with addresses according to the invention. The only way to connect between these two networks should be by use of Firewall or Proxy/NAT servers.
9. There should be optimization for NON-broadcast communication. The use of IP addresses should allow simplification of NON-broadcast data transition for routing protocols, like OSPF or OSPF-TE, and DGP, which are unable to use Broadcast communication. From the point of view of these protocols, the connection between nodes should be described as a simple Point-to-Point connection.

The simplest way to assign an IP address is to add one manually to every node during manufacturing or configuration. It is possible to receive such an address from InterNIC Registration Service or to choose randomly in the case of an isolated network. The main disadvantage of this method is the fact that an assigned IP address cannot be changed automatically, and in many cases cannot be changed at all. Thus, this conventional protocol doesn't fulfill criteria 1 and 3 above.

Automatic IP assignment is a more complicated and powerful method to obtain an IP address. A computer or device without an IP address requests a local or remote server, with unique identification (usually Hardware MAC Address is used), and receives IP addresses back, following the short list of the major IP Assignment protocols and schemes, which were released in the past 20 years.

In 1984, Reverse Address Resolution Protocol (RARP)—the first IP address assignment protocol—was released. TCP/IP uses RARP to initialize the use of Internet addressing on an Ethernet or other network that uses its own media access control (MAC). This protocol uses a remote server with a database of the IP Addresses, and communicates with it by using a hardware network layer (Layer II). This RARP protocol doesn't fulfill the criteria of 3 and 4 above.

In 1985, a new protocol was released. RFC 951 describes an IP/UDP bootstrap protocol (BOOTP), which allows a diskless client machine to discover its own IP address, the address of a server host, and the name of a file to be loaded into memory and executed. The bootstrap operation can be thought of as consisting of two phases. This RFC describes the first phase, which could be labeled 'address determination and bootfile selection'. After this address and filename information is obtained, control passes to the second phase of the bootstrap, where a file transfer occurs. This protocol uses a remote server with a database of IP Addresses, and communicates with it by using a UDP network layer (Layer III). This BOOTP protocol does not fulfill the criteria of 3 and 4 above.

In 1993, an improved version of the BOOTP protocol was released. The Dynamic Host Configuration Protocol (DHCP) provides a framework for passing configuration information to hosts on a TCP/IP network. DHCP is based on the Bootstrap Protocol (BOOTP), adding the capability of automatic allocation of reusable network addresses and additional configuration options. DHCP captures the behavior of BOOTP relay agents, and DHCP participants can interoperate with BOOTP participants. This protocol uses a remote server with a database of IP Addresses, and communicates with it by using UDP network layer (Layer III). This DHCP protocol does not fulfill the criteria of 3 and 4 above.

The main drawback of DHCP (and also RARP and BOOTP) was a security problem. The connection between client and server is unsecured; therefore it is easy to provide a problematic IP address to a DHCP client node. There are several RFC drafts which describe an improved secure version of the DHCP. However, this secure DHCP doesn't fulfill the criterion of 4 above.

The second drawback of the DHCP scheme is reliability. Once a DHCP Server is down, the DHCP client can't receive the requested IP address. Therefore, IETF is working at present to extend the CLIENT-SERVER model of the DHCP, into a CLIENT-MULTISERVER model, which requires a SERVER-SERVER extension protocol. There are several drafts, which describe such a model. However, this Server-to-Server DHCP does not fulfill the criterion of 4 above.

Another way to solve the problem is to assign IP addresses, during Point-to-Point connection, using a Layer II protocol. The IP Control Protocol (IPCP) is responsible for configuring the IP protocol parameters on both ends of the point-to-point link. IPCP uses the same packet exchange mechanism as the Link Control Protocol (LCP). This protocol uses a point-to-point server with a database of IP Addresses, and communicates with it by using a PPP network layer (Layer II). This protocol does not fulfill the criteria of 1 and 3 above.

In short, the IP addressing schemes that are used today to assign IP addresses have different approaches and implementations, but do not fulfill the IP addressing criteria set forth above. Accordingly, there is a long felt need for an IP addressing scheme which will fulfill all the criteria listed above.

SUMMARY OF THE INVENTION

The present invention provides an IP address assignment method including generating an array of unique IP addresses composed using a chassis serial number assigned to a node during manufacture. Every node receives an array of unique IP addresses assigned to its components. All addresses are unique to each other. This is done without preventing the option to configure the IP addresses manually, if user wishes to do so, in a different addressing space.

According to a preferred embodiment, the method includes generation of a chassis serial number during manufacturing, composing a main node IP address during power-up of the node, based on the chassis serial number; and composing a plurality of associated interface addresses based on the node IP address.

Further according to a preferred embodiment, the method further includes composing special pools for DHCP and IPCP.

Further according to the present invention there is provided a computer program product for generating an array of unique IP addresses composed using a chassis serial number assigned to a node during manufacture.

BRIEF DESCRIPTION OF THE DRAWINGS

The present invention will be further understood and appreciated from the following detailed description taken in conjunction with the drawings in which:

FIG. 1 is a schematic illustration of the IP address structure of a node IP address according to one embodiment of the present invention;

FIG. 2 is a schematic illustration of one embodiment of a port IP Address Distribution according to the present invention;

FIG. 3 is a schematic illustration of a conventional system of PPP connections, in which the present invention is useful; and FIG. 4 is a schematic illustration of a conventional system of DHCP sessions where there is an Ethernet direct connection.

DETAILED DESCRIPTION OF THE INVENTION

The present invention relates to an IP address assignment method and system. The proposed method allows assignment of local, unique IP addresses to all network nodes, and to every port of these nodes, including address "pools" for DHCP addresses for connecting networks and IPCP addresses for dial-up connections to the node. It also allows securing the addresses from the "Global Internet" space and avoiding modern hacker attacks, like "SYNC death" or "PING overflow". It also permits merging of two or more previously assigned rings or networks which use the same address system. The assignment process according to the invention is divided into 4 parts:

1) Generation of a chassis serial number during manufacturing.
2) Composing a node address, based on the chassis serial number, during power-up of the node.
3) Composing interface addresses based on the node address.
4) Composing special pools for DHCP, IPCP etc., based on the node address.

The present invention is based on the use of a unique chassis serial number generated during manufacturing of a node. For purposes of the present invention, the term "node" refers to a single PacketLight box Every node is given a unique serial number. The unique serial number is preferably burned into the Serial EPROM (SEEP) (non-volatile memory chip) on the chassis, which is configured during the manufacturing process and which stores the unique number. (The data is reserved during BOOT and RESET processes.) This will permit the generation of the unique IP addresses. These IP addresses have to be unique due to several requirements:

The same IP addresses are not allowed in a single network. Since these addresses are internal (according to RFC 1957 reserved private addresses), they can also be used by other organizations in other networks.

During merger of several networks, it is important to provide uniqueness before and after the merge.

Thus, every node will have a unique IP address (and unique address pool), which will be defined during manufacturing.

The node IP Address is composed during power up of the node from the Chassis serial number and a Class A private network subnet, which is defined in RFC 1597. For purposes of the present application, a subnet includes a collection of nodes, which communicate directly with each other. A group of smaller subnets form a larger network. Some of the network nodes communicate with other nodes via GATEWAY node. Such assignment will allow the addressing system to be secure from Public Internet, on the one hand, and to maintain uniqueness of every node, on the other hand.

Referring now to FIG. 1, there is shown a schematic illustration of the IP address structure of a node IP address 10 according to one embodiment of the present invention. Node IP address 10 has 32 bits (4 bytes), which can be divided as follows:

8 bit (reference 12) to a Class A Network Number 18 bit (reference 14) to the node's serial number. That will allow us to support up to 256 k nodes with different IP addresses.

6 bit (reference 16) to interface address.

According to this illustrated scheme, every node has 64 unique IP Addresses. The first address from 64 preferably goes to the node's main IP address. Another 4 go to IPCP and DHCP pools. (Addresses from the pool will be used by external equipment connected to the node, using dial-up and customer's LAN respectively.) The other 59 addresses are used for interface connections to other nodes, and will be available for different trunk Slots. For purposes of the present invention, an interface is the smallest communication object, connected with another interface. In the system of the invention, every port on the trunk card is an interface. The IP addresses of all interfaces are composed from the node's main IP Address, the slot number of the card in the node, and the number of the port on the card. That means if we have 4 slots fill of cards, and 2 ports on every slot, using the present method, we'll generate 8 unique IP Addresses. This provides uniqueness between all node interfaces. Alternatively, the network elements number can be enlarged (to support more than 2exp18 Network elements), and the number of interfaces can be decreased, if desired. FIG. 2 shows a schematic illustration of one embodiment of a port IP Address Distribution according to the present invention. This example describes address assignment for a node 20, according to one embodiment of the present invention. It will be appreciated that many other possible address distribution arrangements are possible according to the invention. The IP address "a.b.x.y" here is:

a—8 bit
b—8 bit
x—10 bit
y—6 bit

During power up, the main controller card CPU reads the chassis serial number from the BackPlane SEEP of the node (here 000001) and creates the main controller 22 IP address and Backup Switch 24 addresses 10.0.1.1, where 10.0.1.1 is a Class A private number, 10.0.1.1 is serial number of specific node, and 10.0.1.1 is a Slot (Switch card) number. This number is assigned from the node's chassis serial number.

After assignment of the MCC 22 IP address, RS232 26 and Ethernet port 28 pools will be assigned. The numbers for RS232 pool 26 in the illustrated embodiment are 10.0.1.2 and 10.0.1.3, where the first address will be used as the PPP SERVER address, and the second as the PPP Client address and will be assigned to MANAGEMENT during IPCP negotiation. The numbers for Ethernet port pool 28 in the illustrated embodiment are 10.0.1.4 and 10.0.1.5, where the first address will be used as the DHCP SERVER address, and the second as the DHCP Client address and will be assigned to MANAGEMENT during DHCP negotiation, in case of direct Ethernet connection. After assignment of pool addresses, IP addresses will be assigned to every trunk—1 address to each trunk, and 2 addresses for every dual trunk. In this example addresses 10.0.1.6 and 10.0.1.7 will be distributed to the first trunk 30 and second trunk 32 respectively. These addresses are distributed by the MCC card, and depend on the trunk slot number.

Finally, special IPCP and DHCP IP address pools are composed. In order for customers to use standard dial-up connectivity programs to connect remotely to a node by phone, to control this node and the whole network, the PPP Server must distribute IP Addresses to the connected PC. The protocol for such distribution is called IPCP. Thus, a plurality of IP Addresses are reserved for possible dial-up communication. (See FIG. 3) Similarly, every node has ability to be controlled by a standalone PC or laptop. The common, simple and in many cases mandatory way today to communicate between them, is to supply IP address to such Laptop or standalone PC using DHCP protocol. Therefore, a pool of IP addresses must also be reserved for this Ethernet direct connection. (See FIG. 4) Thus, these pools, and the assignment method of the present invention permit connection of nodes of the subnet of the invention not only with each other, but also with various standard external devices (like PC with modems and Internet Software, laptops and standalone computers, etc), without the need to reconfigure them previously.

The system of assigning IP addresses of the present invention has a number of advantages over conventional systems.

Production simplicity: Automatic (as opposed to manual) scheme, based on a "seed" of raw data inside node. In order to use popular management and signaling protocols (like OSPF, MPLS, BGP etc), every interface must be assigned a unique IP address. Today's Telecom practice is to configure these IP addresses manually. Using our technique, a customer doesn't have to configure internal cards by himself. Moreover, the customer doesn't even know its internal IP addresses, but receives the network ready for management traffic flow. This technique will significantly reduce or prevent merger problems, human errors, and security problems.

Allocation: Unique addresses are allocated not only to the management entity, but also to the trunk cards and internal serial and Ethernet pools. This is a new concept that defines each "communication entity" as a connection with its own address, and which solves the traditional "expansion problem", which is a common problem in almost every assignment technique. Every card, service or port in Telecom equipment has to be ready for expansion. In the system of the present invention, for example, at present, 1 IP Address is assigned for 1 port. But in the near future, four IP addresses could be assigned for every port. Therefore, 59 addresses are reserved for the node interfaces, even if today's requirement is only 14 addresses.

Distribution: IP addresses are distributed to the MANAGEMENT instead of the MANAGEMENT distributing to the system. Because of the unique addresses, any ring or net operating with the same addressing system can be interconnected with no need to manually change anything or any probability for address congestion. This addressing system is particularly useful in co-pending U.S. patent application Ser. No. 09/753,400, assigned to the same Assignee, for a system of transporting packets between nodes in a telecommunications network.

It will be appreciated that the invention is not limited to what has been described hereinabove merely by way of example. Rather, the invention is limited solely by the claims which follow.

The invention claimed is:

1. A method for assigning IP addresses in a network including a node with a chassis and a plurality of interfaces, comprising:

obtaining from the chassis a permanent and unique serial number assigned during manufacture, and assigning said permanent and unique serial number to the node;

generating an array of unique IP addresses composed using said permanent and unique chassis serial number; and assigning a unique IP address from said array to the node and to each interface associated with said node.

2. The method according to claim 1, wherein:

a node main IP address is composed during power-up of the node, based on said permanent and unique chassis serial number; and a plurality of associated interface addresses is composed, based on said node main IP address.

3. The method according to claim 2, wherein said step of generating an array includes generating a array of 64 unique IP addresses, each including 32 bits.

4. The method according to claim 2, further including reserving a special pool of DHCP IP addresses to be distributed in a LAN network for connection to said node.

5. The method according to claim 2, further including reserving a special pool of IPCP IP addresses to be distributed to dial-up users for connection to said node.

6. The method according to claim 2, wherein the IP address of each interface is composed from said node main IP address, a slot number of a card in said node associated with said interface, and a number of a port on the card associated with the interface.

7. The method according to claim 1, wherein said step of generating an array includes generating a array of 64 unique IP addresses, each including 32 bits.

8. The method according to claim 1, further including reserving a special pool of DHCP IP addresses to be distributed in a LAN network for connection to said node.

9. The method according to claim 1, further including reserving a special pool of IPCP IP addresses to be distributed to dial-up users for connection to said node.

10. The method according to claim 1, additionally comprising assigning a permanent and unique serial number to the chassis during manufacture.

11. The method according to claim 1, wherein the permanent and unique serial number is burned into a non-volatile memory chip on the chassis.

12. A computer program product for IP address assignment in a network including a node with a chassis and a plurality of interfaces, comprising:

a computer-readable storage medium containing a set of instructions for a computer, the set of instructions, when executed by the computer, causing the computer to perform the steps of:

obtaining from the chassis a permanent and unique serial number assigned during manufacture, and assigning said permanent and unique serial number to the node;

generating an array of unique IP addresses composed using the permanent and unique chassis serial number assigned to the node; and assigning a unique IP address from said array to the node and to each interface associated with said node.

13. The computer program product according to claim 12, wherein the set of instructions causes the assignment of a unique main node IP address to the node upon power-up of the node, and subsequent assignment of a unique IP address to each element associated with the node from said array based on the main node IP address.

* * * * *